Feb. 20, 1923.
C. L. HENDERSON
1,445,883
APPARATUS FOR CONTROLLING GRINDER STONES IN PULP MILLS
Filed Dec. 3, 1921   3 sheets-sheet 2
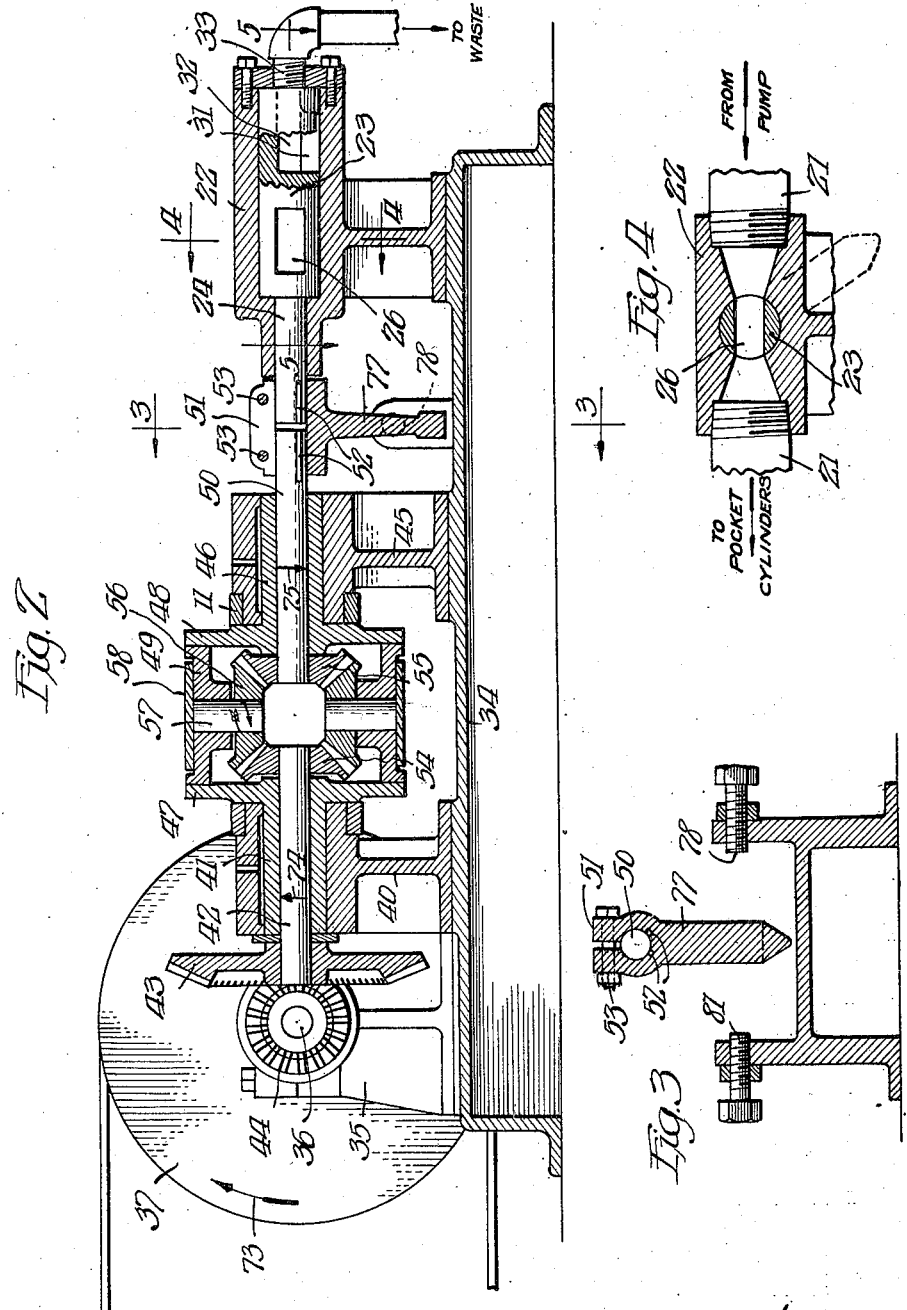
Inventor:
Charles L. Henderson
By Fisher Towle Clapp & Soans Attys.

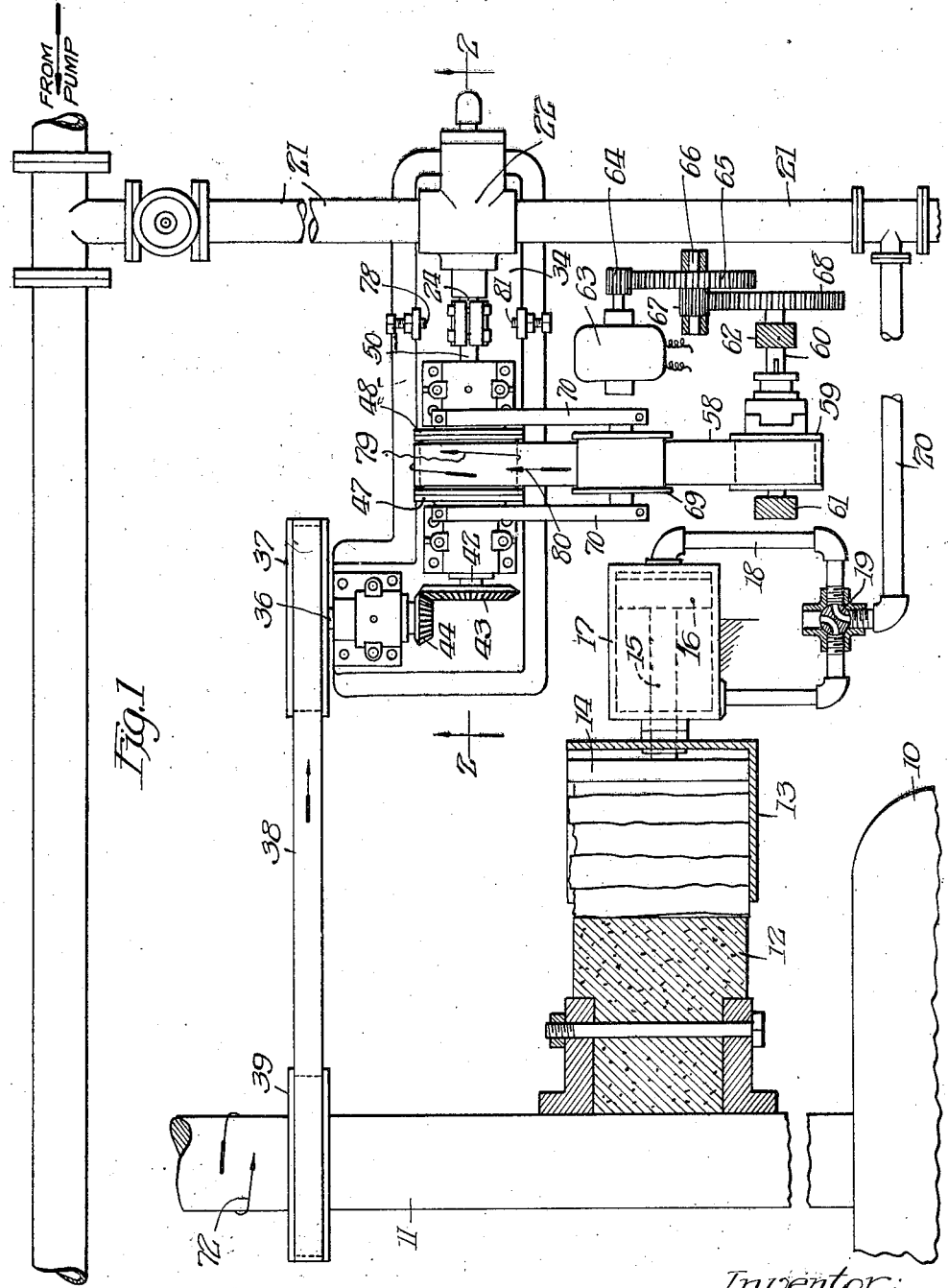

Feb. 20, 1923.
C. L. HENDERSON
APPARATUS FOR CONTROLLING GRINDER STONES IN PULP MILLS.
Filed Dec. 3, 1921
3 sheets-sheet 3
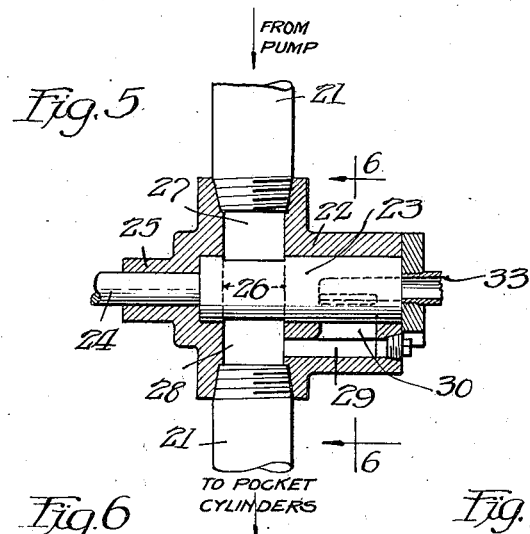
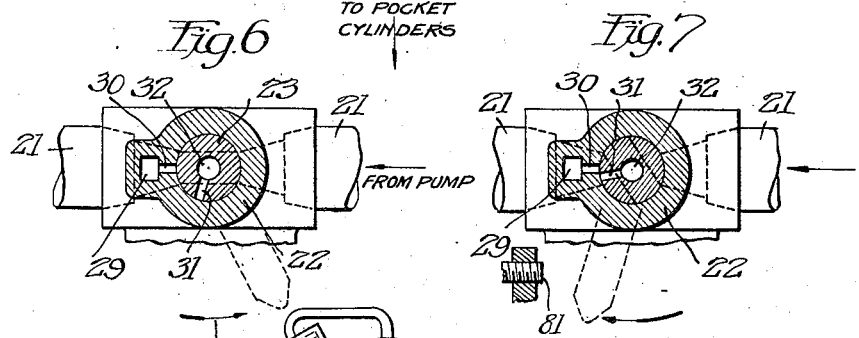
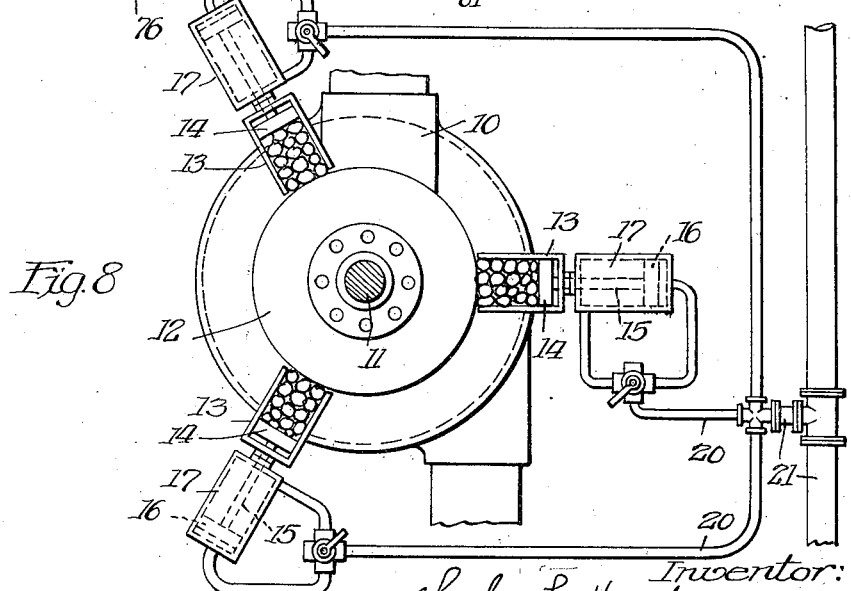
Inventor:
Charles L. Henderson
By Fisher Towle Clapp & Soans Attys.

Patented Feb. 20, 1923.

1,445,883

UNITED STATES PATENT OFFICE.

CHARLES L. HENDERSON, OF APPLETON, WISCONSIN, ASSIGNOR TO KIMBERLY-CLARK COMPANY, OF NEENAH, WISCONSIN, A CORPORATION OF WISCONSIN.

APPARATUS FOR CONTROLLING GRINDER STONES IN PULP MILLS.

Application filed December 3, 1921. Serial No. 519,737.

*To all whom it may concern:*

Be it known that I, CHARLES L. HENDERSON, a citizen of the United States, residing at Appleton, in the county of Outagamie and State of Wisconsin, have invented certain new and useful Improvements in Apparatus for Controlling Grinder Stones in Pulp Mills, of which the following is a specification.

My invention relates to improvements in method and apparatus for controlling grinder stones in pulp mills, and has special value in connection with grinder stones which are driven by motors having substantially uniform power capacity, for example, water wheels.

In this country, in view of the fact that pulp mills require large quantities of water, they are generally located at such points that there are available, not only the required supply of water, but also a sufficient head of water to operate certain portions of the mill apparatus which require considerable quantities of mechanical power. Generally such water power is employed for driving the grinder stones which are used for producing the ground wood or mechanical pulp required for use in the mill. The water wheels or turbines which are connected to the stones are not ordinarily equipped with speed governors for a number of reasons. In the first place, the governing of the speed of the water wheel or turbine, which consumes a large quantity of water, is attended with considerable mechanical difficulty and very often with waste of water. Also the equipment necessary for such governing is relatively expensive, both in first cost and to operate and maintain in efficient working order; also, owing to the fact that the water power available must usually be utilized to the utmost in order to conserve power cost, it is desirable to be able to operate the grinder stones at full load and at maximum efficiency continuously over extended periods. In any case, whatever the reasons may be, in this country, it has not been the custom to equip with governors, the water wheels or turbines used for driving grinder stones.

The absence of governing mechanism for the grinder stones, on the other hand, results in undesirable conditions. In the first place, when the supply of wood in the pockets of the stone become exhausted, the load on the stone is correspondingly reduced, resulting in a considerable increase in speed. Such increase in speed is a point of danger in the operation of the grinder stones which frequently explode by reason of the excessive speed, often causing serious property damage and sometimes loss of life. Furthermore, and of still more importance, from a practical standpoint, the excessive speed of the stone has a deleterious effect upon the pulp produced, since it is found that pulp, to be of the highest quality, must be produced within certain ranges of pressure and speed.

With the above conditions in mind, it will be understood that the principal objects of my invention are, to provide a method and apparatus of controlling grinder stones whereby the speed of the stone may be prevented from rising above or below certain prescribed limits found desirable for the most successful operation; to provide a system of operating grinder stones whereby the power consumption may be maintained substantially constant and whereby the efficiency of the motive power may be maintained at a maximum; to provide a system and arrangement of the class described so organized that the production of pulp and the quality thereof is the highest possible; to provide an apparatus for the purpose described which may be manufactured and installed at minimum expense and which may be operated and maintained inexpensively and efficiently, and in general, to provide a rugged, reliable and efficient apparatus of the character referred to.

In the drawings which illustrate my invention as applied to a grinder stone driven by a water wheel or a turbine, Fig. 1 is a plan view of the complete apparatus, certain parts being shown on an exaggerated scale in order to render the drawing more legible;

Fig. 2 is a section taken on the line 2—2 of Fig. 1;

Fig. 3 is a section taken on the line 3—3 of Fig. 2;

Fig. 4 is a section taken on the line 4—4 of Fig. 2;

Fig. 5 is a section taken on the line 5—5 of Fig. 2;

Fig. 6 is a section taken on the line 6—6 of Fig. 5;

Fig. 7 is a section similar to Fig. 6, but showing the controlling valve in a different position; and Fig. 8 is a section more or less diagrammatic, showing the grinder stone and water wheel in elevation.

Referring to the drawings, 10 represents somewhat diagrammatically the water turbine which operates the shaft 11 on which the grinder stone 12 is mounted in the usual manner. Said grinder stone is equipped with the required number of pockets, usually three, said pockets being indicated at 13 in Figs. 1 and 8.

As is customary in the art, the pockets 13 are equipped with rams or plunger heads 14 rigidly connected by means of piston rods 15 to pistons 16 in the pressure cylinders 17. Motive fluid, in the present instance water under pressure is applied to the rear or outer ends of pressure cylinders 17 by pipes 18 connected through suitable four-way valves 19 and pipes 20 to a supply pipe 21 common to the three pressure cylinders. Water under pressure is supplied to the pipe 21 from a suitable source, such as a pump, preferably equipped with a pressure reservoir whereby the water pressure may be maintained at a substantially constant figure. It will be understood that the water used for supplying pressure in the pockets need have no connection with the main water supply which operates the turbine 10. The governing element comprises a controlling valve contained within a casing 22 interposed at a convenient point in the run of the pressure supply pipe 21. As indicated best in Figs. 2, 4, 5, 6 and 7, said valve comprises a cylindrical body portion 23 rigidly mounted on a frame integral with an operating stem 24 extending through a boss 25 and one side of the valve casing. The body of the valve 23 is slotted or apertured as shown at 26, the ends of said slot registering with ports 27 and 28 formed in the casing and communicating with the pipe 21, the port 27 being thus in free communication with the pump or other pressure-water source, while the port 28 is connected directly with the pocket cylinders. By reference to Figs. 2, 5, 6 and 7, it will be observed that there is formed in the valve casing 22, a longitudinally extending duct 29 which communicates with the port or passage 28 and also with a narrow port slot 30 in the extended end of the casing. Said slot 30 is adapted, on occasion to register with a cooperating slot 31 formed radially in the body of valve 23 and communicating with a centrally longitudinally extending recess or passage 32 the outer end of which communicates freely with an aperture or pipe 33, connected to waste or sewer.

The purpose of said auxiliary or bleed port 30 is to relieve the pressure in the pockets without delay whenever the grinder stone slows down from any cause.

The controlling valve above described is operated automatically, and in accordance with changes in the speed of the stone, by means of the mechanism now to be described.

Such mechanism is mounted upon a suitable base casting 34 which also serves as a support for the valve housing 22. At the end of said casing there is journaled in a suitable bracket or pedestal 35 a transverse shaft 36, which shaft 36 is driven by pulley 37 keyed thereon. Said pulley 37 is connected by means of a belt 38 to a similar pulley 39 keyed on the shaft 11 of the grinder stone. Hence, said transverse shaft 36 will rotate at the same speed as grinder stone shaft 11.

Located adjacent to the pedestal 35, having its bearing axis at right angles thereto, I mount on said base 34, a second pedestal 40, within which is journaled a sleeve 41, said sleeve serving as a bearing for shaft 42. On the outer end of said shaft 42 there is keyed a bevel gear 43 which meshes with a bevel pinion 44 keyed to the adjacent end of transverse shaft 36. Bevel gear 43 has twice the number of teeth as bevel pinion 44, therefore shaft 42 will rotate at one-half the speed of the grinder stone shaft. Aligned with pedestal 40 is a short pedestal 45, said pedestal serving as a journal bearing for a sleeve 46, similar to sleeve 41. Said sleeves 41 and 46 are provided with radially extending flanges 47 and 48 spaced apart to admit a drum or pulley 49. Said flanges 47 and 48 are rigidly secured to the sides of said pulley 49 so that sleeves 41 and 46 will be thereby rigidly connected together and revolve as a unit. The sleeve 46 serves as a journal bearing for a shaft 50 with which the valve stem 24 is aligned, and to which said sleeve stem 24 is rigidly connected, by means of a suitable coupling 51 suitably bored out to receive the adjacent ends of shaft 50 and stem 24.

The coupling may be, if desired, equipped with suitable keys as at 52 and is preferably provided with a pair of clamping bolts 53 for the purpose of locking said valve stem 24 and shaft 50, said stem 24 thus being in effect an integral extension of shaft 50.

To the adjacent opposed ends of shafts 42 and 50 there are keyed, respectively, two similar opposed bevel pinions 54 and 55, said pinions being suitably spaced to mesh with one or more planetary differential bevel gears 56 carried by stub shafts 57 mounted in drum 49, said stub shafts 57 being disposed with their axes extending radially from the center of drum 49 which is concentric with the axes of shafts 42 and 50.

The drum 49 is turned off at its outer periphery to accommodate a flat belt 58 which belt 58 drives said pulley 49 from a pulley 59 keyed to shaft 60, said shaft 60 being mounted to rotate in suitable bearings 61 and 62 and is driven at a uniform speed and continuously by a suitable motive power such as an electric motor 63. A train of gearing comprising pinion 64, spur gear 65, shaft 66, pinion 67 and spur gear 68 serves to reduce the speed of said shaft 60 so that the pulley 49 will be driven at one-half the normal speed of shaft 42, that is to say, at one-fourth of the speed of the grinder stone shaft. Preferably, in order to maintain at all times satisfactory driving tension on the belt 58, while permitting a certain amount of slippage incidental to the successful operation of the apparatus, I employ a rider or jockey pulley 69 resting on the top stretch of belt 58, and located in position by arms 70, having their ends 71 pivoted on the ends of pedestals 40 and 45.

The operation of the apparatus is as follows:

The grinder stone 12 revolves in the direction of arrow 72, and hence drives pulley 37 in the direction of arrow 73 (see Fig. 2). This results in a rotary movement of shaft 42 in the direction of arrow 74. If the drum 49 were stationary and bevel pinions 56 fixed as to their axes, the rotary movement of shaft 42 in direction of arrow 74 would result in a reverse rotary movement of shaft 50 in the direction of arrow 75. Hence, in the absence of rotation of drum 49, shaft 50 will tend to rotate in the direction of arrow 75, so as to rock the valve stem 24 and valve 23 in the direction of arrow 76 (see Fig. 6). Such rotation of valve 23 is, however, arrested when the valve is fully open, as in Fig. 6, by means of a stop arm 77 integral with coupling 51 and the end of which engages an adjustable stop screw 78.

Thus, if the drum 49 were stationary, rotation of the grinder stone would result in the controlling valve being rocked into the position shown in Figs. 4 and 6, and the full pressure of the pump would be communicated to the cylinders of the grinder pockets, thereby forcing the wood against the surface of the grinder stone with maximum pressure. However, in view of the fact that the drum 49 is not stationary, but may revolve on its sleeves 41 and 46 in pedestals 40 and 45, said drum will rotate at an average speed equal to half the speed of the shaft 42, or one-fourth of the speed of the grinder stone shaft. Such rotation of the drum 49 will be in the direction of arrow 79 which is the same direction as the direction of rotary movement of drum 49 under the influence of belt 58 (see arrow 80). Thus, if motor 63 and grinder stone shaft 11 are exactly synchronized, there will be no tendency to rotate shaft 50, and hence the controlling valve 23 will not be actuated in either direction. In practice, it is found that the controlling valve 23 oscillates slightly continuously due to slight variations in speed of grinder stone shaft 11. When grinder stone shaft 11 races or tends to rise in speed, the controlling valve will tend to rock into the position shown in Fig. 6, thus admitting more pressure water from the pump to the pocket cylinders, whereby, due to the greater frictional drag upon the stone, the latter will tend to slow down.

When the grinder stone slows down, due to excessive pressure in the pockets, the valve 23 will tend to be rocked in the opposite direction into the position shown in Fig. 6 and toward stop screw 81 (see Fig. 3). When in such sub-normal position as shown in Fig. 7, the communication between the pump and the pressure cylinders will be completely closed by reason of the closing of the main valve opening 26 in addition to which, if ordinary leakage of the pistons does not sufficiently reduce the pressure of the stone and allow its speed to normalize, the valve 23 will be rocked still further toward the stop 81, thereby opening bleed port 31 which will effectively rob the pocket cylinders of pressure.

The described details of construction and operation are merely illustrative of a single phase of my invention, the scope of which should be determined by reference to the appended claims, said claims being construed as broadly as possible, consistent with the state of the art.

I claim as my invention:

1. In apparatus for controlling grinder stones used for making mechanical pulp for paper mills, the combination of a source of power, a grinder stone coupled to said source, a pocket for holding wood which is being ground, means for pressing said wood against the stone and means controlled by the speed of the stone for varying said pressure, said last named means comprising differentially connected elements, one of which is driven at substantially constant speed and the other at a speed bearing a fixed ratio to the stone speed.

2. Apparatus for controlling a grinder stone used for making mechanical pulp for paper mills, comprising in combination a source of power, means operated by said power for varying the load on said stone, a constant speed element and a member differentially acted upon by said constant speed element and by said grinder stone for automatically controlling said load controlling means in accordance with change of grinder stone speed.

3. In combination, a grinder stone, pressure actuated means for applying load to said stone, a valve for controlling said pressure and means whereby said valve will be actuated automatically to supply pressure when the grinder stone speed rises and to reduce the pressure when the grinder stone speed falls, the arrangement including auxiliary means for reducing pressure when the valve is closed.

4. In a device of the class described, the combination of a rotary valve for controlling fluid pressure, a shaft for actuating said valve, a pinion on said shaft, a shaft driven by the grinder stone, a gear on said last named shaft, a planetary gear meshing with said first two gears, and a rotary support for said last named gear operated at constant speed.

5. In combination, a grinder stone, a pocket cylinder, a source of fluid pressure, a valve for controlling said pressure, a shaft for actuating said valve a bevel gear on said shaft, a bevel gear axially aligned with said first named gear and driven by the stone, a rotary support axially aligned with said shaft, a planetary differential bevel gear mounted on said support to mesh with both of said gears and means for driving said support in the proper direction at constant speed whereby said valve will be substantially unacted upon by said shaft when the grinder stone gear is driven at twice the speed of the support.

CHARLES L. HENDERSON.